Patented Jan. 29, 1952

2,583,657

UNITED STATES PATENT OFFICE 2,583,657

LOW WATER-LOSS CEMENT AND PROCESS OF MAKING

Peggy J. Lea, Kansas City, Mo., and Henry B. Fisher, Bartlesville, Okla., assignors to Phillips Petroleum Company, a corporation of Delaware No Drawing. Application July 11, 1949, Serial No. 104,151

20 Claims. (Cl. 106—93)

1

This invention relates to low-water loss cement slurries. In one specific aspect it relates to low-water loss cement slurries comprising hydraulic cement, such as Portland cement, with or without non-cementing inert granular aggregate material, which hydraulic cement may or may not contain the usual minor additives common to hydraulic cements such as calcium sulfate and/or calcium chloride as an example in amounts up to 3% to retard the time of set, a small but effective amount of an acid alkyl sulfoethyl cellulose ether or its alkali metal, alkaline earth metal or ammonium salts, said alkyl group preferably being the ethyl radical and being limited to one selected from the methyl, ethyl and propyl radicals, and sufficient water to make a slurry.

In the art of cementing oil wells and in grouting cracks in masonry structures there is a tendency for the cement slurry to lose water at such an extent that it becomes dehydrated, set, or cracked prematurely, with the result that it cannot be properly placed in position due to an increase in viscosity of the slurry, and resulting increases in force necessary to pump or move the slurry into position. This deleterious dehydration is increased in many oil wells by the modern practice of scratching, or scraping the drilling mud from the wall of the well by mechanical means prior to placing the cement, which often exposes porous formations which will absorb the water from the slurry. This is particularly important when oil sands are penetrated, as artificial contamination of oil sands with water will often cause shaley impurities in the sand to swell and reduce the permeability of said oil sand to a very great extent. Therefore water lost from the slurry tends to seal off the formation to oil flow. When it is intended to cement with slurry, and then gun perforate the hardened slurry, the gun perforator may not be able to penetrate into the formation beyond the slurry to a sufficient depth to penetrate into the region beyond that in which the shaley impurities are swollen by the water extracted by the formation from the slurry. In such cases the oil production rate of the well may be severely reduced by water contamination from the slurry.

We have found that by adding a small but effective amount of an acid alkyl sulfoethyl cellulose ether or salts of the same, preferably ethyl sodium sulfoethyl cellulose ether in the amount of 1% based on the weight of dry cement and preferably using ordinary commercial Portland cement containing the usual additives, along with sufficient water to make a slurry, that the water

2 loss as determined by filtration tests is greatly reduced and contamination of the formation is substantially prevented.

One object of the present invention is to provide an improved low water-loss cement slurry useful in grouting in general, in cementing the walls of wells, and for cementing pipe in wells.

Another object is to provide a low water-loss cement which will not contaminate the earth formations in bore holes with water to any substantial extent.

Another object is to provide a cement slurry suitable for use in oil well cementing operations.

Numerous other objects and advantages will be apparent upon reading the accompanying specification and claims.

In preparing the slurry the dry ingredients comprising hydraulic cement, with or without additives for increasing the time of set, the inert filler material, such as sand or crushed limestone, and the acid alkyl sulfoethyl cellulose ethers, or alkali metal, alkaline earth metal, or ammonium salt of the same, may be mixed together and later mixed with water, or any of them may be mixed separately with water, and then mixed together to form the cement slurry, as long as the mixing of the hydraulic cement with water is done promptly before placing the slurry in position.

By hydraulic cement we intend to include all mixtures of lime, silica, and alumina, or of lime and magnesia, silica, and alumina and iron oxide (magnesia for example may replace part of the lime, and iron oxide a part of the alumina) as are commonly known as hydraulic cements. Hydraulic cements include hydraulic limes, grappier cements, puzzalan cements, natural cements, and Portland cements. Puzzalan cements include slag cements made from slaked lime and granulated blast furnace slag. Because of its superior strength Portland cement is preferred among the hydraulic cements, but as the art of cements recognizes hydraulic cements as a definite class, and as results of value may be obtained with any member of that class, it is desired to claim all hydraulic cements.

In most oil well cementing and grouting operations it is generally desirable to use neat cement for added strength, but obviously it is always possible to add any desired amount of an inert granular filling material or aggregate such as sand, ground limestone, or any of the other well known inert aggregates, as long as the amount added does not reduce the strength below the desired value. In operations in open wells it is often desirable to use neat cement, because inert filling material will automatically become detached from the walls of the well, and will tend to mix with and dilute the slurry to such an extent that it is undesirable to add any filling material to the slurry being forced into the well.

The amount of water added is not critical, it being obvious that sufficient water should be added to form a pumpable slurry, and that when the slurry becomes pumpable no further water need be added. One advantage of the slurry of the present invention is that it is a low water-loss slurry, and therefore it is not necessary to add excess water over the amount making the slurry pumpable as a reserve for expected losses, which would tend to reduce the strength of the cement.

In order to reduce the water loss of the cement slurry we add a small but effective amount of an acid alkyl sulfoethyl cellulose ether or one of its alkali metal, alkaline earth metal or ammonium salts. The acid and all of these salts are equivalents because the material is added in small amounts and the hydraulic cement slurry has sufficient metal ions present to change the acid to the salt in the slurry. For the alkyl group we prefer the ethyl radical, although the methyl, or propyl radical can be employed. While all alkali metals are equivalent, sodium, potassium and lithium are the only ones which can be employed economically. By alkaline earth metals we mean calcium, barium, strontium and magnesium.

For the purpose of illustrating the material with a formula, cellulose may be regarded as consisting of a number of anhydroglucose residues X, each having three hydroxyl radicals— OH thereon. The residue X is repeated a large number of times, represented by $n$, which may be 100 or more. Most of the OH radicals are unchanged, but enough of them are substituted (as will be explained below) to make the material water soluble. As degrees of substitution are difficult to determine, we have found that the degree of substitution rendering the material water soluble is a sufficient test for its utility. By water soluble, we mean that it appears to be water soluble to the eye, as whether it is a true solution or some sort of dispersion is not in question, the prior art referring to such materials as water soluble. The material is of value to the extent that it is water soluble, and border line substances may be used which are only partly or barely water soluble, but better results are obtained when the material is clearly water soluble. The ethyl radical —$CH_2CH_3$ replaces some of the hydrogen atoms in the —OH radicals of the celluloses and the metal or ammonium (represented by M) sulfoethyl radical

—$CH_2CH_2SO_3M$ replaces the hydrogen in other of the —OH radicals, not necessarily attached to the same residue X, but to some residue X of the same cellulose molecule, to such an extent that the material is water soluble. The formula therefore is represented as follows:

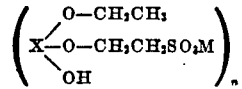

In the case of the acid material the metal M is replaced by hydrogen, and in the case of the ammonium material by $NH_4$.

We have found that from 0.1% to 3% of acid alkyl sulfoethyl cellulose ether or their alkali metal, alkaline earth metal, or ammonium salts, is particularly effective in reducing the water loss of hydraulic cement aqueous slurries, with or without inert filling material present.

A Portland cement slurry was made up with fifteen pounds of cement to the gallon of slurry, and 1% of ethyl sodium sulfoethyl cellulose ether by weight (based on the dry Portland cement) was added to one-half of the sample. The two halves of the sample were tested separately according to the test procedure for drilling muds described in A. P. I. code 29 and the sample which had no additive lost 105 cc. of water in one minute and 15 seconds through the standard filter paper at 100 p. s. i., whereas under the exact same conditions the half of the sample containing the ethyl sodium sulfoethyl cellulose ether only lost 1.4 cc. of water in 30 minutes. Obviously, the portion of the sample without the additive would lose water to the formation of a well to such an extent that it would dehydrate and have a premature setting, or bridging effect, which would increase the pressure needed to place the slurry to a degree making the operation inoperative in many wells having porous formations, and the water from the slurry would contaminate such formations, whereas the portion of the sample containing the additive would not give up water to such a formation, and would remain easily pumpable into place during continued exposure to such a formation.

The cement slurry used in these tests was composed of 53 grams of water per 100 grams of cement to give a cement slurry containing approximately 15 pounds of cement per gallon. Because of the strong alkalinity of hydraulic cements in general, including Portland cement, it can be predicted that the acid alkyl sulfoethyl cellulose ether, and the enumerated metal and ammonium salts thereof, will all give equivalent results in this test, and it is well understood that methyl, ethyl, and propyl radicals are substantially equivalent in this compound all giving beneficial results. It is also obvious that inert filling material will not substantially affect the result of this test, when used in an amount not large enough to deleteriously reduce the strength of the cement slurry after setting.

The cement slurry set into a hard cement suitable for use in well cementing and grouting after the water loss test described above when it contained the effective amount of water-loss reducing additive, but the same cement slurry without the additive set in a cracked and weakened condition after said above mentioned water-loss test due to water lost in said test.

The above example and tests are given for illustrative purposes and should not be regarded as limiting the invention, the scope of which is set forth in the following claims:

Having described our invention, we claim:

1. A cement capable of forming a fluid slurry when mixed with water, said cement comprising a hydraulic cement mixed with a minor proportion of at least one of the group consisting of acid alkyl sulfoethyl cellulose ether and alkali metal, alkaline earth metal and ammonium salts of the same wherein the akyl group contains from 1 to 3 carbon atoms.

2. A cement capable of forming a fluid slurry when mixed with water, said cement comprising Portland cement mixed with a minor proportion of at least one of the group consisting of acid alkyl sulfoethyl cellulose ether and alkali metal.

alkaline earth metal and ammonium salts of the same wherein the alkyl group contains from 1 to 3 carbon atoms.

3. A hydraulic cement slurry comprising a hydraulic cement, water, and a minor proportion of at least one of the group consisting of acid alkyl sulfoethyl cellulose ether and alkali metal, alkaline earth metal and ammonium salts of the same wherein the alkyl group contains from 1 to 3 carbon atoms.

4. A hydraulic cement slurry comprising Portland cement, water, and a minor proportion of at least one of the group consisting of acid alkyl sulfoethyl cellulose ether and alkali metal, alkaline earth metal and ammonium salts of the same wherein the alkyl group contains from 1 to 3 carbon atoms.

5. A cement capable of forming a fluid slurry when mixed with water, said cement comprising a hydraulic cement mixed with a minor porportion of ethyl sodium sulfoethyl cellulose ether.

6. A cement capable of forming a fluid slurry when mixed with water, said cement comprising Portland cement mixed with a minor proportion of ethyl sodium sulfoethyl cellulose ether.

7. A hydraulic cement slurry comprising a hydraulic cement, water and a minor porportion of ethyl sodium sulfoethyl cellulose ether.

8. A hydraulic cement slurry comprising Portland cement, water, and a minor proportion of ethyl sodium sulfoethyl cellulose ether.

9. A cement capable of forming a fluid slurry when mixed with water, said cement comprising a hydraulic cement mixed with from 0.1% to 3% by weight of dry cement of at least one of the group consisting of acid alkyl sulfoethyl cellulose ether and alkali metal, alkaline earth metal and ammonium salts of the same wherein the alkyl group contains from 1 to 3 carbon atoms.

10. A cement capable of forming a fluid slurry when mixed with water, said cement comprising Portland cement mixed with from 0.1% to 3% by weight of dry cement of at least one of the group consisting of acid alkyl sulfoethyl cellulose ether and alkali metal, alkaline earth metal and ammonium salts of the same wherein the alkyl group contains from 1 to 3 carbon atoms.

11. A hydraulic cement slurry comprising a hydraulic cement, water, and from 0.1% to 3% by weight of dry cement of at least one of the group consisting of acid alkyl sulfoethyl cellulose ether and alkali metal, alkaline earth metal and ammonium salts of the same wherein the alkyl group contains from 1 to 3 carbon atoms.

12. A hydraulic cement slurry comprising Portland cement, water, and from 0.1% to 3% by weight of dry cement of at least one of the group consisting of acid alkyl sulfoethyl cellulose ether and alkali metal, alkaline earth metal and ammonium salts of the same wherein the alkyl group contains from 1 to 3 carbon atoms.

13. A cement capable of forming a fluid slurry when mixed with water, said cement comprising a hydraulic cement mixed with from 0.1% to 3% by weight of dry cement of ethyl sodium sulfoethyl cellulose ether.

14. A cement capable of forming a fluid slurry when mixed with water, said cement comprising Portland cement mixed with from 0.1% to 3% by weight of dry cement of ethyl sodium sulfoethyl cellulose ether.

15. A hydraulic cement slurry comprising a hydraulic cement, water, and from 0.1% to 3% by weight of dry cement of ethyl sodium sulfoethyl cellulose ether.

16. A hydraulic cement slurry comprising Portland cement, water, and from 0.1% to 3% by weight of dry cement of ethyl sodium sulfoethyl cellulose ether.

17. The process of producing a hydraulic cement aqueous slurry having a reduced water loss to porous formations which comprises admixing with hydraulic cement from 0.1 per cent to 3 per cent by weight of the dry cement of at least one of the group consisting of acid alkyl sulfoethyl cellulose ether and alkali metal, alkaline earth metal and ammonium salts of the same wherein the alkyl group contains from 1 to 3 carbon atoms, and interacting therewith sufficient water to produce a fluid slurry.

18. The process of producing a hydraulic cement aqueous slurry having a reduced water loss to porous formations which comprises admixing with hydraulic cement a minor proportion effective to reduce the water loss of said slurry of at least one of the group consisting of acid alkyl sulfoethyl cellulose ether and alkali metal, alkaline earth metal and ammonium salts of the same wherein the alkyl group contains from 1 to 3 carbon atoms, and interacting therewith sufficient water to produce a fluid slurry.

19. The process of producing a hydraulic cement aqueous slurry having a reduced water loss to porous formations which comprises admixing with hydraulic cement from 0.1 per cent to 3 per cent by weight of the dry cement of ethyl sodium sulfoethyl cellulose ether and interacting therewith sufficient water to produce a fluid slurry.

20. The process of producing a hydraulic cement aqueous slurry having a reduced water loss to porous formations which comprises admixing with hydraulic cement a minor proportion effective to reduce the water loss of said slurry of ethyl sodium sulfoethyl cellulose ether and interacting therewith sufficient water to produce a fluid slurry.

PEGGY J. LEA.
HENRY B. FISHER.

REFERENCES CITED

The following references are of record in the file of this patent:

UNITED STATES PATENTS

| Number | Name | Date |
|---|---|---|
| 2,469,353 | Alcorn | May 10, 1949 |
| 2,489,793 | Ludwig | Nov. 29, 1949 |